UNITED STATES PATENT OFFICE.

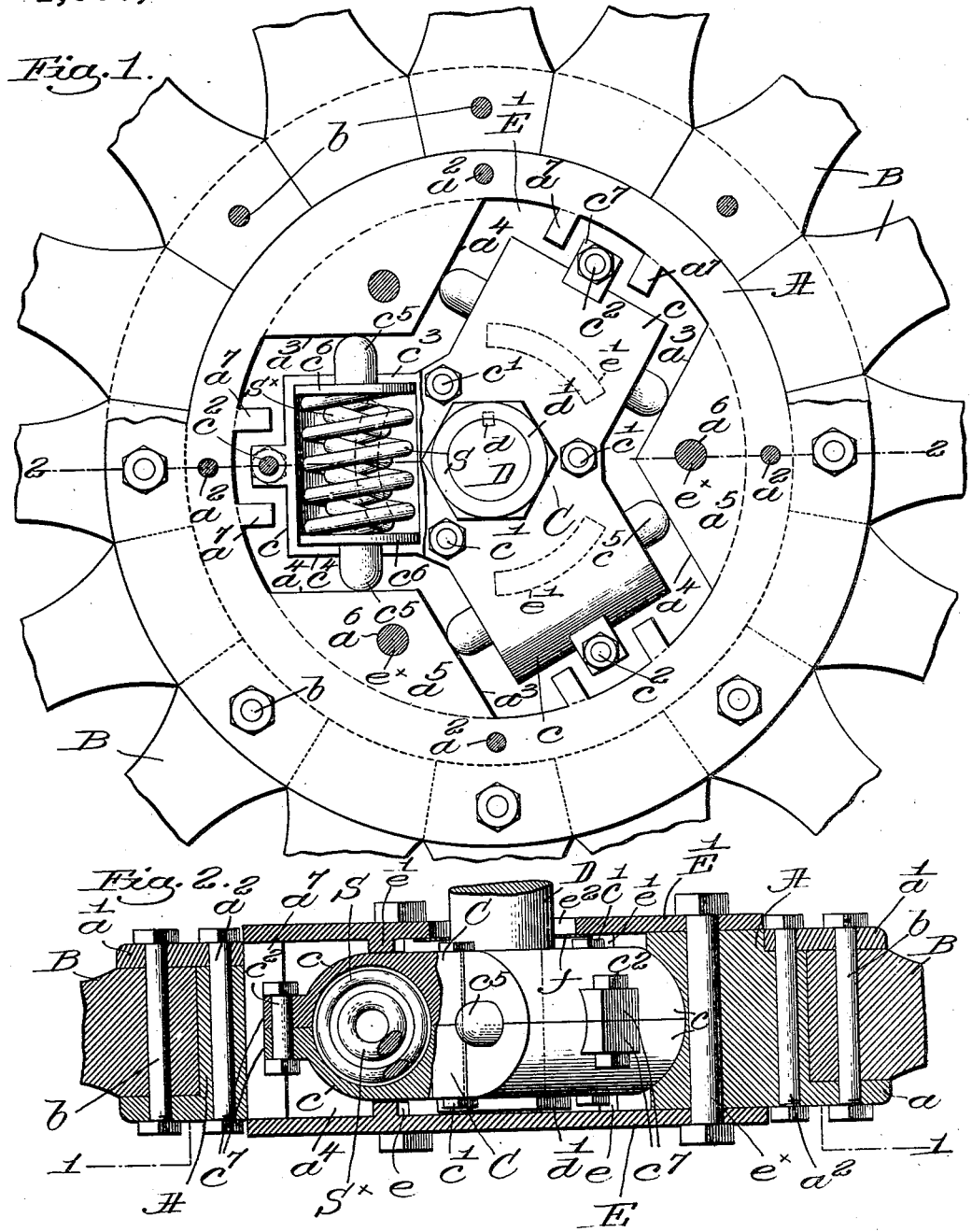

COURTLAND G. CAPWELL, OF BOSTON, MASSACHUSETTS, ASSIGNOR OF THIRTY-SEVEN ONE-HUNDREDTHS TO FRED RUWITSER, OF SOUTH ACTON, MASSACHUSETTS, AND TWENTY-FIVE ONE-HUNDREDTHS TO JOHN H. MOORE, OF BOSTON, MASSACHUSETTS.

RESILIENT WHEEL FOR VEHICLES.

1,007,333.  Specification of Letters Patent.  Patented Oct. 31, 1911.

Application filed December 23, 1909. Serial No. 534,569.

*To all whom it may concern:*

Be it known that I, COURTLAND G. CAPWELL, a citizen of the United States, and resident of Boston, county of Suffolk, State of Massachusetts, have invented an Improvement in Resilient Wheels for Vehicles, of which the following description, in connection with the accompanying drawing, is a specification, like characters on the drawing representing like parts.

This invention relates to resilient wheels for vehicles, of that type wherein the rim or felly is fixedly connected by spokes with an outer hub member which is yieldingly connected with an inner hub member, the latter being at all times concentric with the axle, the yielding connecting means between the two hub members permitting the wheel to yield under strain and by its resiliency obviating the use of pneumatic or other cushion tires.

My invention has for its object the production of novel means for yieldingly connecting the two hub members, whereby the desired resilience is secured in a very simple, efficient, strong and durable manner, the construction being such that the working parts may be permanently inclosed in grease or other lubricant and the entrance of dust and dirt prevented.

The various novel features of my invention will be fully described in the subjoined specification and particularly pointed out in the following claims.

Figure 1 is a side elevation and partial section of a sufficient portion of a resilient wheel embodying one form of my invention, the section being taken on the line 1—1, Fig. 2, the upper half of one of the cylinders being broken out; Fig. 2 is a transverse section on the line 2—2, Fig. 1, but with the axle and its retaining nut shown in elevation.

Herein I have shown the outer hub member A as annular in general shape, and provided on one of its flat sides with a peripheral flange $a$, and its opposite side is recessed to form a seat for a removable ring $a'$, Fig. 2, adapted to be rigidly secured to the member A by suitable bolts $a^2$, said flange and ring, with the circular periphery of the hub member, constituting a channel in which are tightly fitted the butt or inner ends of spokes B. Said spokes are longitudinally rigid and at their outer ends are secured in any customary manner to the wheel rim or felly (not shown) the felly and the hub member A thus being connected in a rigid and unyielding manner, and if desired the butts of alternate spokes may be held in place by retaining bolts $b$.

In the present embodiment of my invention I have arranged upon the inner periphery of the annular member A a plurality of pairs of abutments $a^3$, $a^4$, and as shown in Fig. 1 the abutments are flat or plane faces arranged so that the two constituting a pair are opposite each other and parallel. The abutments are arranged symmetrically with relation to the center of the member A, and the segmental portions $a^5$ of said member between adjacent abutments $a^3$, $a^4$, are provided with bolt-holes $a^6$ for a purpose to be described. Between each pair of opposite abutments I have shown the member A as having two separated and inturned ears $a^7$, to be referred to hereinafter. The outer hub member is yieldingly connected with and sustains the inner hub member, to be described, the latter being permanently concentric with the axle, but the outer member is free to assume eccentric positions with relation to the axle, as will be understood.

In the present embodiment of my invention the inner hub member is made in two like parts or halves, preferably castings, and each half comprises a central hub member or portion C apertured to receive the axle D, the latter having a key $d$ and a retaining nut $d'$, to fixedly connect the axle and the hub member, the portion C being shown herein as triangular and having along each of its sides a half cylinder $c$. When the two halves are assembled face to face, and connected by bolts $c'$, $c^2$, it will be seen that a plurality of symmetrically arranged cylinders are presented, each one having its longitudinal axis at right angles to a radius of the inner hub member. The cylinders are interposed between opposed pairs of abutments $a^3$, $a^4$, as shown in Fig. 1, with the centrally apertured cylinder ends $c^3$, $c^4$, substantially parallel to such abutments but at some distance therefrom. A pair of oppositely extended plungers $c^5$ are mounted to slide longitudinally in each cylinder and project through the ends thereof to engage and coöperate with the opposite and adjacent abutments, the engaging ends of the plungers being preferably convexed, as shown, to minimize friction, each plunger having at its inner end a circular head $c^6$, see Fig. 1, wherein the nearer half of the left hand cylinder is broken out. Opposed lugs $c^7$ on the outer side of the two halves of each cylinder are rigidly connected by the bolts $c^2$, and said connected lugs project between a pair of the inturned ears $a^7$ on the hub member A, there being sufficient clearance to permit the proper relative yielding movement between the inner and outer hub members while at the same time relative rotative movement of such members is limited. By this limitation the plungers are at all times maintained in proper coöperation with the abutments. A strong spiral spring S is interposed between the two plunger heads $c^6$ in each cylinder, to at all times press the plungers firmly against their coöperating abutments, and yieldingly resisting inward movement of the plungers when subjected to pressure by or against the abutments.

Referring to Fig. 2 it will be seen that the opposite sides of the member C and external portions of the cylinders are flat and parallel, giving great strength and rigidity while at the same time presenting a compact structure, the making of the member C and the connected cylinders in separable halves affording easy means for assembling the parts and providing for repairs when necessary. The springs S I term the main springs, as they act at all times upon the plungers, but I prefer to inclose within them auxiliary springs $S^x$ which are not brought into substantial action until the load carried by the wheel is quite materially increased. That is, in equipping an automobile with wheels embodying my invention the main springs S would serve to sustain the dead weight of the body, frame, motor, etc. while the auxiliary springs $S^x$ would come into play when the automobile receives its variable load of passengers, baggage, etc.

From the foregoing description, taken in connection with the drawings, it will be seen that in all angular positions of the wheel the load weight transmitted through the axle D will be sustained yieldingly by at least two plungers and their coöperating abutments, and such load weight will be transferred by such means to the outer hub member. The axle and inner hub member is thus yieldingly sustained by the outer or spoke-carrying member, and the use of pneumatic or other forms of cushion tires is obviated. Undue relative lateral movement of the inner and outer members is prevented by means of circular outer and inner cap-plates E, E', Fig. 2, which are held tightly against the flat sides of the member A by means of bolts $e^x$ extended through the holes $a^6$ hereinbefore referred to, segmental flat-faced ribs $e$ and $e'$ on the inner faces of the plates coöperating with the flat external walls of the cylinders $c$, as shown in Fig. 2. The outer plate E is imperforate and tightly closes the interior of the annular hub member A, but the plate E' is provided with an axle-receiving aperture $e^2$, larger than the axle, such aperture being closed by a ring-washer $f$ surrounding the axle inside of said plate, as shown in Fig. 2. Thus the inner side of the hub member A is substantially tightly closed, and in the chamber thus provided a viscous or semi-solid grease or lubricant can be retained, to lubricate the moving parts interposed between the inner and outer members of the hub. The grease can only escape at the inner side of the hub adjacent the axle, and at such point there is very slight opportunity for escape, as will be manifest, so that the working parts are well protected by the cap-plates from the entrance of dust, dirt or moisture.

While I have shown herein the axle as rigidly attached to the inner hub member it will be manifest that the axle may loosely fit such member to permit rotation of the latter upon the axle, both modes of procedure being common in resilient wheels of the type to which my invention belongs.

My invention may be modified or re-arranged in various respects by those skilled in the art without departing from the spirit and scope of my invention as set forth in the claims annexed hereto.

Having fully described my invention, what I claim as new and desire to secure by Letters Patent is:—

1. The combination, with an inner hub member at all times concentric with the axle, a plurality of rigidly connected and symmetrically disposed cylinders carried by said member, each cylinder having its longitudinal axis at right angles to a radius of the hub member centrally intersecting the cylinder, a pair of oppositely extended plungers longitudinally movable in each cylinder and projecting beyond the ends thereof, and springs to sustain the plungers, of a loosely surrounding outer hub member having within its circumference inwardly extended, flat abutments arranged in opposite pairs parallel to each other to receive between them a cylinder and to engage the outer ends of the plungers of such cylinder, and means independent of the abutments to limit relative rotative movement of said hub members.

2. The combination with an inner hub member always concentric with the axle and comprising two like parts bolted together, each part having a plurality of semi-cylinders symmetrically disposed with their longitudinal axes at right angles to radii of the hub member, a headed plunger projecting through each end of each cylinder and longitudinally movable therein, and spiral springs inclosed in the cylinders between the heads of the plungers, to resist inward movement thereof, of a loosely surrounding, annular outer hub member having internal abutments disposed opposite the cylinder ends and engaged by the plungers, and means to prevent relative lateral movement of said hub members.

3. The combination with an inner hub member and a loosely surrounding outer hub member, and spokes attached to the latter, of a plurality of rigidly connected and symmetrically disposed cylinders carried by one of said members, each cylinder having its longitudinal axis at right angles to an intersecting radius of the supporting hub member, a pair of oppositely extended plungers longitudinally movable in each cylinder and convexed at their outer ends beyond the adjacent ends of the cylinder, a sustaining spring interposed between the inner ends of each pair of plungers, to resist inward movement thereof and flat abutments on the other of said hub members and arranged in parallel pairs to be engaged by the convexed ends of a pair of the plungers, each of the plunger-cylinders being interposed between a pair of abutments.

4. The combination, with an axle, a plurality of symmetrically disposed cylinders connected therewith concentrically, and having their longitudinal axes at right angles to radii of the axle, a pair of oppositely movable plungers in each cylinder and projecting beyond the opposite ends thereof, and springs in the cylinders between the inner ends of the plungers, to resist inward movement thereof, of a loosely surrounding, annular member having spokes fixedly attached thereto, a plurality of abutments arranged in opposite pairs parallel to each other within said member, to coöperate with the pairs of plungers and yieldingly sustain the axle within the spoke-carrying member, each cylinder and its plungers being interposed between a pair of abutments, and means independent of the abutments to limit relative rotative movement of said member and the axle.

5. The combination, with an axle, a plurality of rigidly connected cylinders symmetrically disposed around the axle and operatively connected therewith, the longitudinal axis of each cylinder being at right angles to an intersecting radius of the axle, a pair of oppositely movable plungers in each cylinder and projecting beyond the opposite ends thereof, and springs in the cylinders between the inner ends of the plungers, to resist inward movement thereof, of a loosely surrounding, annular member having spokes fixedly attached thereto, a plurality of flat abutments arranged in opposite pairs parallel to each other within said member, to coöperate with the pairs of plungers and yieldingly sustain the axle within the spoke-carrying member, each cylinder being interposed between a pair of abutments, means to maintain the plungers and abutments in coöperation while permitting eccentric movement of the annular member relative to the axle, and cap-plates fixedly attached to said member and inclosing the cylinders, plungers and abutments, said cap-plates coöperating with opposite sides of the cylinders and preventing lateral movement of the spoke-carrying member upon the axle.

6. The combination with an inner hub member, permanently concentric with the axle, and a loosely surrounding outer hub member having attached spokes, of a plurality of rigidly connected cylinders carried by one of said members and arranged symmetrically with relation to the center thereof, with their longitudinal axes at right angles to radii of such member, spring-controlled plungers longitudinally movable in the cylinders and having their outer ends projecting beyond the opposite ends of the same, a plurality of flat abutments carried by the other one of said hub members and arranged in parallel pairs opposite to and engaged by the projecting ends of the plungers of a cylinder interposed between a pair of abutments to yieldingly sustain the inner hub member and permit the outer hub member to move eccentrically to the axle, and springs within the cylinders and acting upon the plungers to maintain said plungers and abutments in operative engagement.

In testimony whereof, I have signed my name to this specification, in the presence of two subscribing witnesses.

COURTLAND G. CAPWELL.

Witnesses:
Louis C. Smith,
Thomas J. Drummond.

Correction in Letters Patent No. 1,007,333.

It is hereby certified that the name of the first mentioned assignee in Letters Patent No. 1,007,333, granted October 31, 1911, upon the application of Courtland G. Capwell, of Boston, Massachusetts, for an improvement in "Resilient Wheels for Vehicles," was erroneously written and printed "Fred Ruwitser," whereas said name should have been written and printed *Fred Rawitser*; and that the said Letters Patent should be read with this correction therein that the same may conform to the record of the case in the Patent Office.

Signed and sealed this 28th day of November, A. D., 1911.

[SEAL.]

E. B. MOORE,
*Commissioner of Patents.*